United States Patent
Suzuki et al.

(10) Patent No.: US 10,121,086 B2
(45) Date of Patent: Nov. 6, 2018

(54) INFORMATION PROCESSING APPARATUS AND INFORMATION PROCESSING METHOD

(71) Applicant: KABUSHIKI KAISHA TOSHIBA, Minato-ku, Tokyo (JP)

(72) Inventors: Kaoru Suzuki, Yokohama Kanagawa (JP); Yojiro Tonouchi, Inagi Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 300 days.

(21) Appl. No.: 15/060,151

(22) Filed: Mar. 3, 2016

(65) Prior Publication Data
US 2017/0017856 A1   Jan. 19, 2017

(30) Foreign Application Priority Data

Jul. 14, 2015   (JP) .................................. 2015-140489

(51) Int. Cl.
*G06K 9/32*   (2006.01)
*H04N 5/232*   (2006.01)
(Continued)

(52) U.S. Cl.
CPC ........... *G06K 9/325* (2013.01); *G06F 3/0488* (2013.01); *G06F 3/04817* (2013.01);
(Continued)

(58) Field of Classification Search
None
See application file for complete search history.

(56) References Cited

U.S. PATENT DOCUMENTS

| 5,410,611 A | 4/1995 | Huttenlocher et al. |
| 5,557,689 A | 9/1996 | Huttenlocher et al. |
| (Continued) | | |

FOREIGN PATENT DOCUMENTS

| JP | 05-054186 | 3/1993 |
| JP | 05-159099 | 6/1993 |
| (Continued) | | |

OTHER PUBLICATIONS

U.S. Appl. No. 15/058,542, filed Mar. 2, 2016, Suzuki et al.
(Continued)

*Primary Examiner* — Jayanti K Patel
*Assistant Examiner* — Shadan E Haghani
(74) *Attorney, Agent, or Firm* — Knobbe, Martens Olson & Bear, LLP

(57) ABSTRACT

According to one embodiment, an information processing apparatus includes a hardware processor and a controller. The hardware processor detects a first region in an image that includes a character and detects a second region in the image that includes a text-line including at least a particular number of first regions. The controller causes the hardware processor to detect the second region in the image when a variation of a camera is less than or equal to a threshold. The controller changes a setting of the hardware processor associated with the detection of at least one of the first and second region and causes the hardware processor to detect the second region in the image when the second region is not detected.

19 Claims, 12 Drawing Sheets

(51) Int. Cl.
  *G06F 3/0481* (2013.01)
  *G06F 3/0488* (2013.01)
  *G06T 1/20* (2006.01)
  *G06K 9/00* (2006.01)
  *G06K 9/22* (2006.01)

(52) U.S. Cl.
  CPC ......... *G06K 9/00456* (2013.01); *G06K 9/228* (2013.01); *G06T 1/20* (2013.01); *H04N 5/23267* (2013.01); *H04N 5/23293* (2013.01); *G06K 2209/011* (2013.01)

(56) References Cited

U.S. PATENT DOCUMENTS

| | | | |
|---|---|---|---|
| 5,687,253 | A | 11/1997 | Huttenlocher et al. |
| 5,949,906 | A | 9/1999 | Hontani et al. |
| 6,188,790 | B1 | 2/2001 | Yoshikawa et al. |
| 6,330,358 | B1 | 12/2001 | Nagaishi |
| 7,221,399 | B2 | 5/2007 | Fujita |
| 7,965,904 | B2 | 6/2011 | Kobayashi |
| 8,139,862 | B2 | 3/2012 | Shimodaira |
| 9,269,009 | B1* | 2/2016 | Liu .................. G06K 9/18 |
| 9,355,336 | B1* | 5/2016 | Jahagirdar ......... G06K 9/6217 |
| 9,640,173 | B2* | 5/2017 | Pulz ................ G10L 13/086 |
| 9,843,759 | B2* | 12/2017 | Jojic .................. H04N 5/445 |
| 2003/0086615 | A1 | 5/2003 | Dance et al. |
| 2006/0120629 | A1 | 6/2006 | Myers et al. |
| 2009/0238494 | A1 | 9/2009 | Ochi et al. |
| 2009/0309892 | A1 | 12/2009 | Uehori et al. |
| 2010/0141758 | A1 | 6/2010 | Kim et al. |
| 2012/0092329 | A1* | 4/2012 | Koo ................ G06K 9/3258 345/419 |
| 2012/0099795 | A1* | 4/2012 | Jojic ............... G06K 9/3266 382/199 |
| 2013/0262106 | A1* | 10/2013 | Hurvitz ............ G10L 15/183 704/235 |
| 2015/0073770 | A1* | 3/2015 | Pulz ................ G10L 13/086 704/3 |
| 2015/0138399 | A1* | 5/2015 | Ma ................ G06K 9/00624 348/239 |
| 2015/0371404 | A1* | 12/2015 | Liu ................... G06K 9/34 382/199 |
| 2016/0063340 | A1 | 3/2016 | Suzuki et al. |
| 2016/0078631 | A1 | 3/2016 | Takahashi et al. |
| 2016/0155309 | A1* | 6/2016 | Watson ............ A61B 5/14552 600/324 |
| 2016/0269625 | A1 | 9/2016 | Suzuki et al. |
| 2016/0309085 | A1* | 10/2016 | Ilic ................... G06T 3/4038 |
| 2016/0328827 | A1* | 11/2016 | Ilic ................... H04N 5/2624 |
| 2016/0330374 | A1* | 11/2016 | Ilic ................... H04N 5/23251 |
| 2017/0221121 | A1* | 8/2017 | Davis ............... G06Q 30/0625 |

FOREIGN PATENT DOCUMENTS

| | | |
|---|---|---|
| JP | 05-189691 | 7/1993 |
| JP | 05-258118 | 10/1993 |
| JP | 05-258119 | 10/1993 |
| JP | 06-044405 | 2/1994 |
| JP | 06-245032 | 9/1994 |
| JP | 07-085215 | 3/1995 |
| JP | 07-093476 | 4/1995 |
| JP | 07-105310 | 4/1995 |
| JP | 07-152857 | 6/1995 |
| JP | 07-182459 | 7/1995 |
| JP | 08-190610 | 7/1996 |
| JP | 08-194776 | 7/1996 |
| JP | 08-315067 | 11/1996 |
| JP | 11-203404 | 7/1999 |
| JP | 11-272801 | 10/1999 |
| JP | 2000-030052 | 1/2000 |
| JP | 2000-181988 | 6/2000 |
| JP | 2001-307017 | 11/2001 |
| JP | 2001-331803 | 11/2001 |
| JP | 2002-117373 | 4/2002 |
| JP | 2002-123825 | 4/2002 |
| JP | 2002-207963 | 7/2002 |
| JP | 2005-055969 | 3/2005 |
| JP | 3677666 | 8/2005 |
| JP | 2006-172083 | 6/2006 |
| JP | 3891981 | 3/2007 |
| JP | 2008-039611 | 2/2008 |
| JP | 2008-097588 | 4/2008 |
| JP | 2008-123245 | 5/2008 |
| JP | 2008-234160 | 10/2008 |
| JP | 4164568 | 10/2008 |
| JP | 2008-287517 | 11/2008 |
| JP | 2009-230411 | 10/2009 |
| JP | 2010-231686 | 10/2010 |
| JP | 2012-221372 | 11/2012 |
| JP | 2013-246677 | 12/2013 |
| JP | 2016-045877 | 4/2016 |
| JP | 2016-062263 | 4/2016 |
| JP | 2016-167128 | 9/2016 |

OTHER PUBLICATIONS

"Word Lens", Wikipedia, the free encyclopedia, https://en.wikipedia.org/wiki/Word_Lens, Jun. 2, 2015.

Pan, Yi-Feng, et al. "A Hybrid Approach to Detect and Localize Texts in Natural Scene Images", IEEE Transactions of Image Processing, vol. 20. No. 3, Mar. 2011, pp. 800-813, 14 pgs.

\* cited by examiner

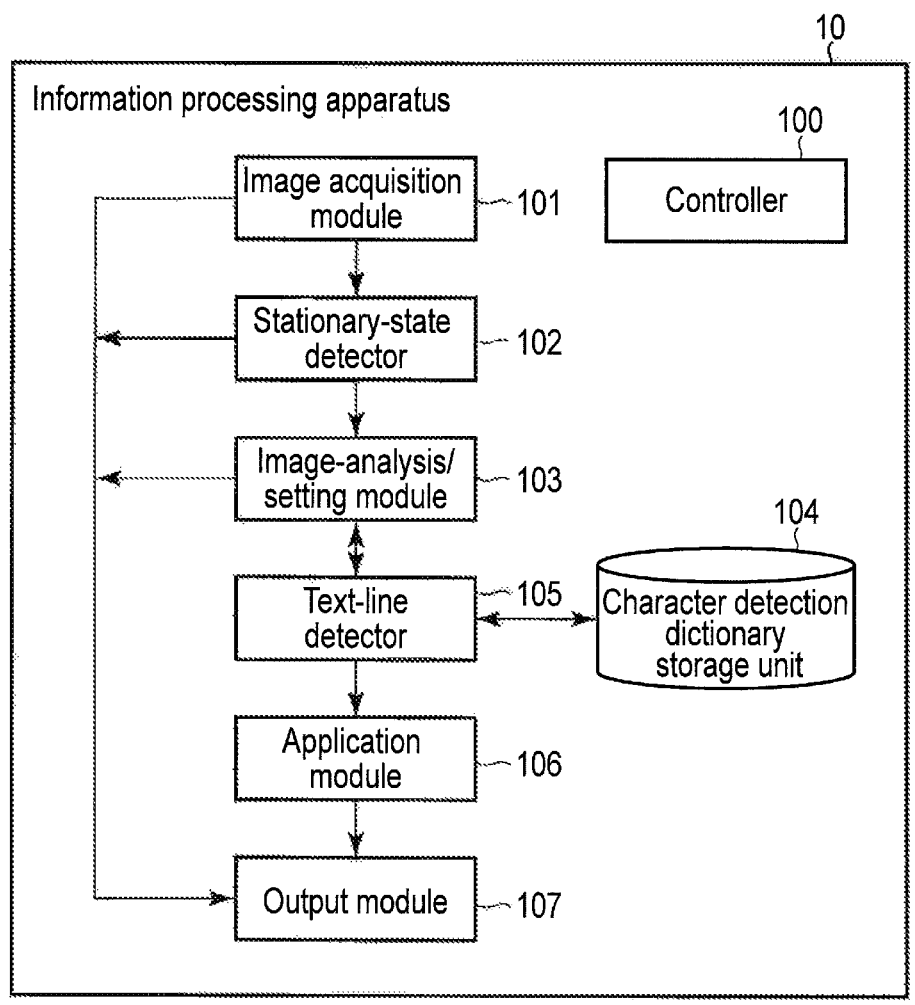
F I G. 1

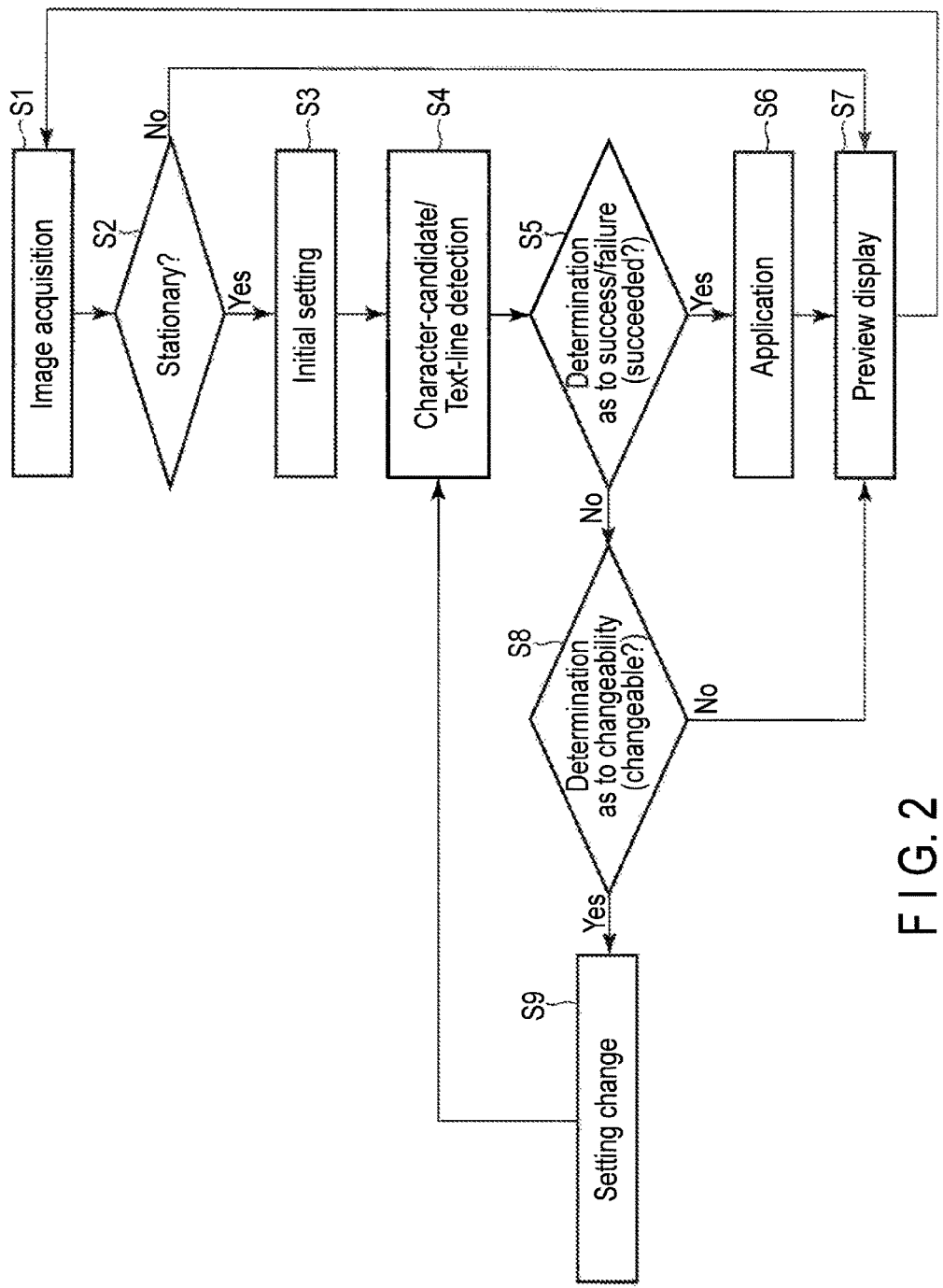
F I G. 2

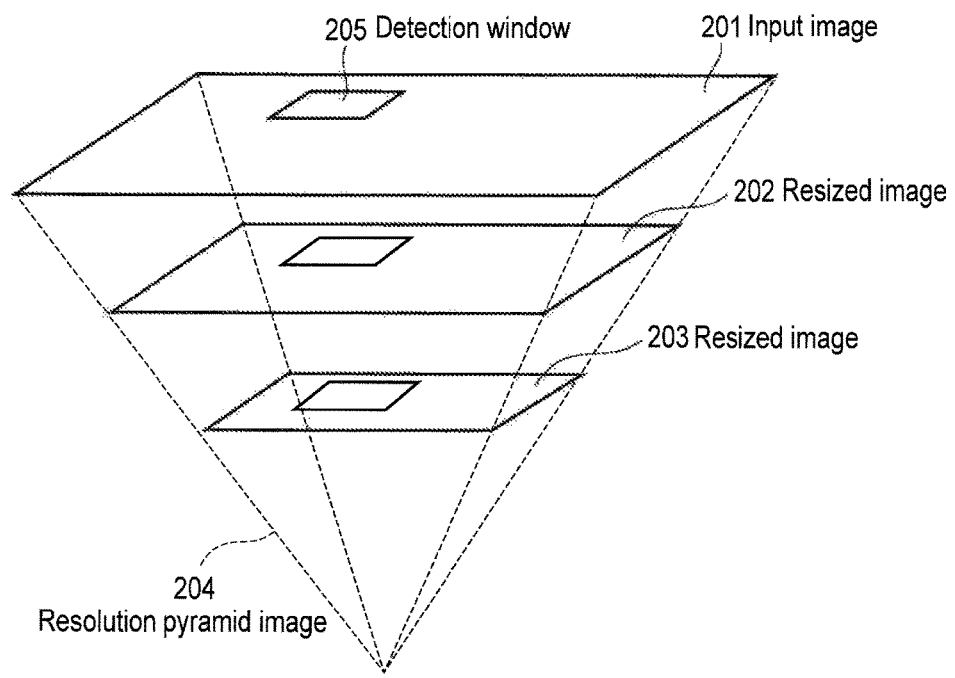
F I G. 4
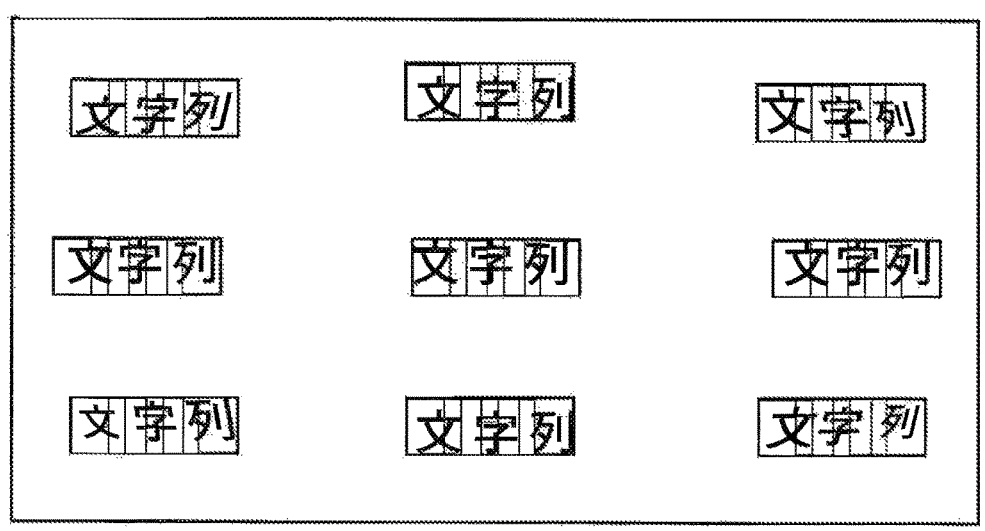
F I G. 5

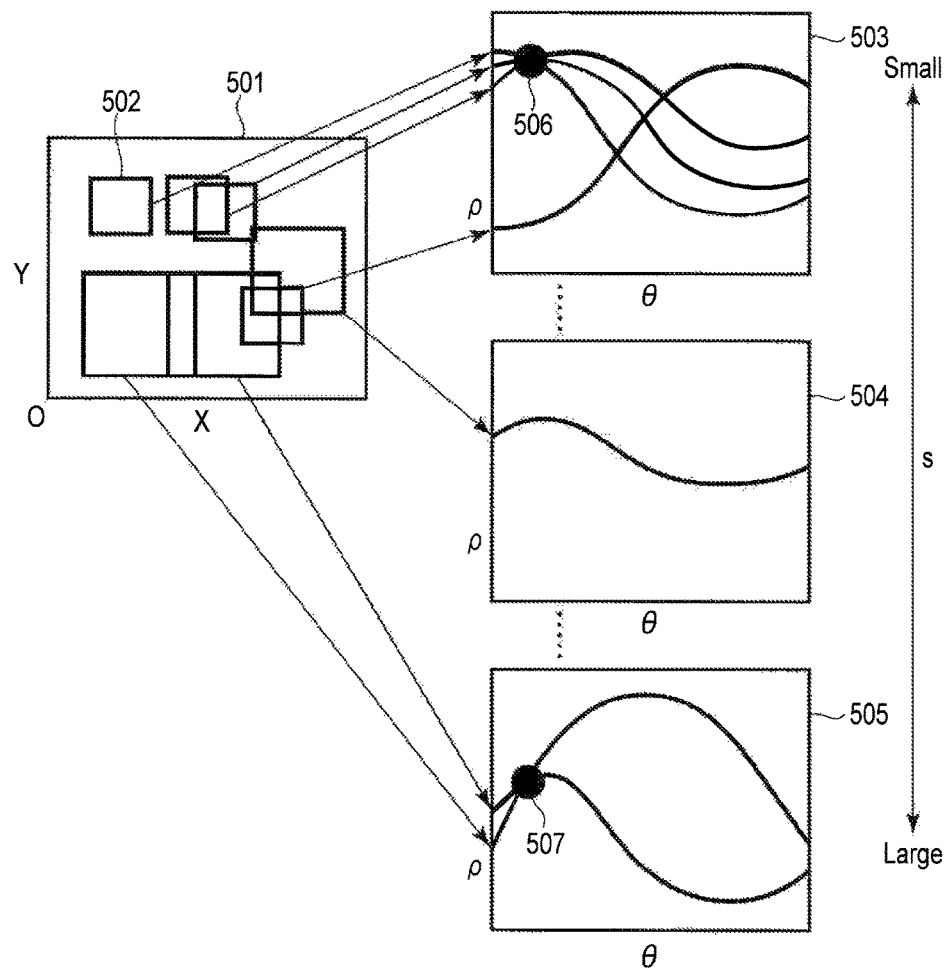
F I G. 8

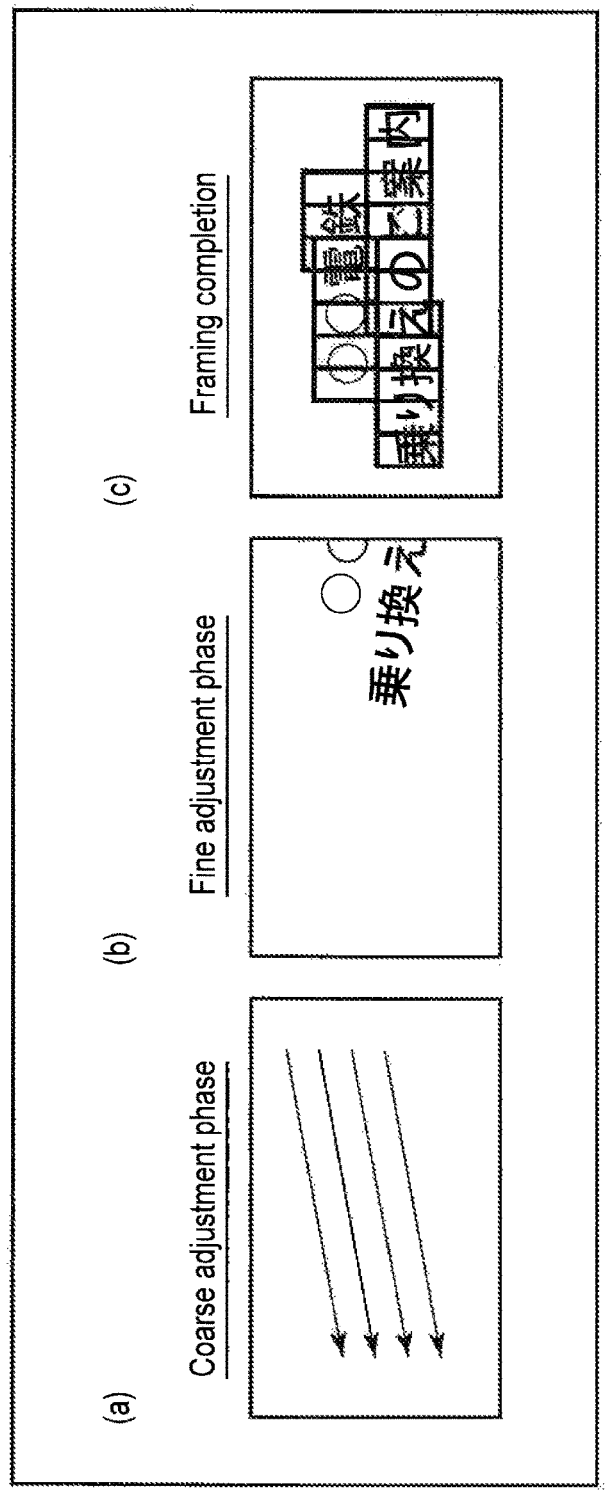
F I G. 9

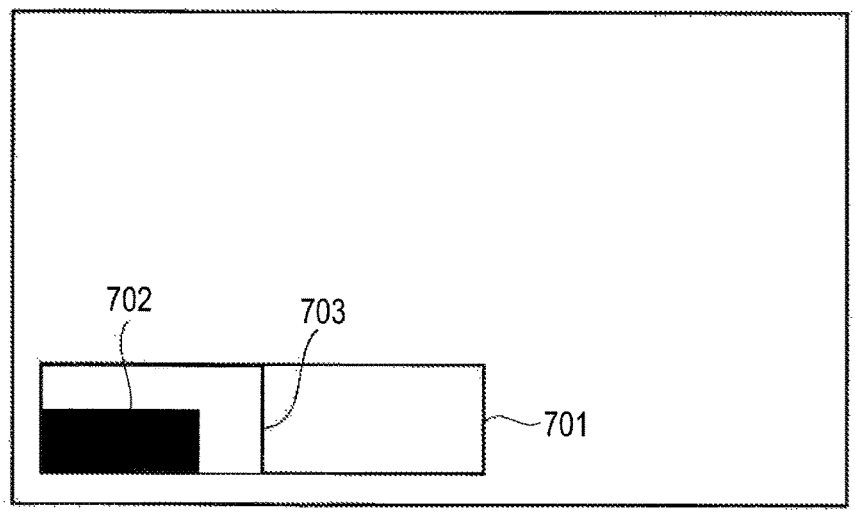
F I G. 11
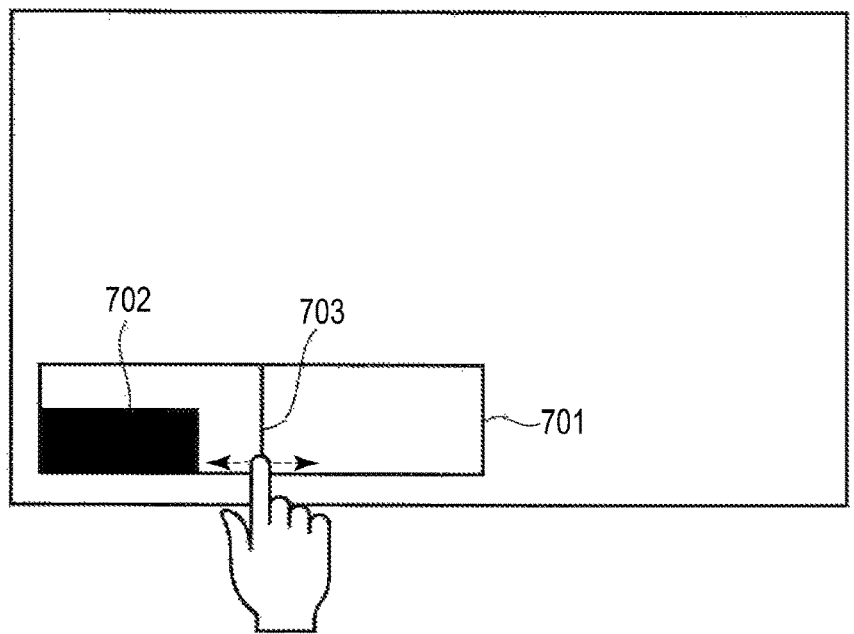
F I G. 12

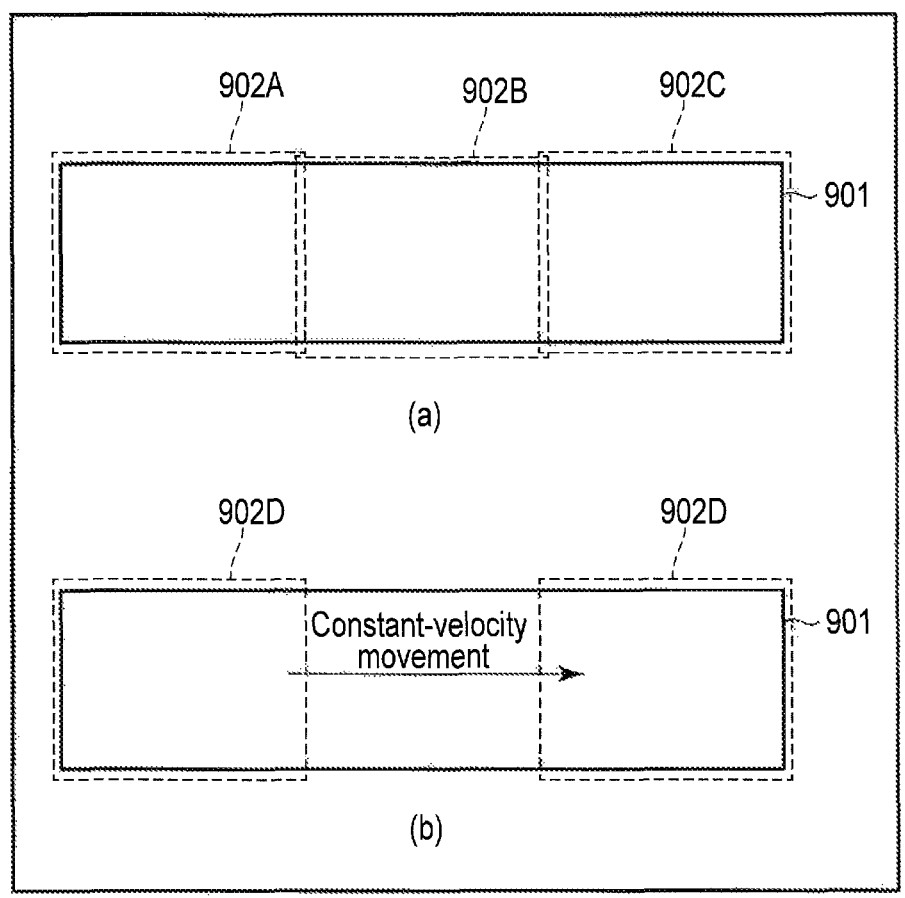
F I G. 14

INFORMATION PROCESSING APPARATUS AND INFORMATION PROCESSING METHOD

CROSS-REFERENCE TO RELATED APPLICATIONS

This application is based upon and claims the benefit of priority from Japanese Patent Application No. 2015-140489, filed Jul. 14, 2015, the entire contents of which are incorporated herein by reference.

FIELD

Embodiments described herein relate generally to an information processing apparatus and an information processing method.

BACKGROUND

In recent years, information processing apparatuses which detect characters written on a signboard, an indicator, a paper sheet, etc., in an image captured by a camera, and which perform character recognition processing or translation processing on the detected characters have come to be widely used. When using the information processing apparatus, it is necessary for a user to perform an operation called framing, in which the user detects, through a preview screen on a display, where the camera is currently imaging, and moves the information processing apparatus toward a character string as an imaging target to make it fall within the imaging range of the camera.

In other words, it may be assumed that during framing, the entire character string as a target of detection, recognition, translation, etc. is not set in a captured image (in particular, in substantially the center of the image), and that the entire character string as the target is finally set in the captured image (in particular, in substantially the center of the image) upon the completion of the framing. However, the conventional information processing apparatus has a problem that since a reject setting (such as setting of a threshold for detection) supposing a case where a captured image contains no characters, that is, a reject setting where excessive detection does not easily occur, is always activated under predetermined strict conditions, a character string, if there is any in an image obtained after framing, may not be detected because of the too strict conditions.

BRIEF DESCRIPTION OF THE DRAWINGS

FIG. 1 is a block diagram showing a configuration example of an information processing apparatus of an embodiment.

FIG. 2 is a flowchart showing an operation example of the information processing apparatus of the embodiment.

FIG. 4 is a schematic view for explaining character candidate detection processing executed by a text-line detector incorporated in the information processing apparatus of the embodiment.

FIG. 5 is a schematic view for explaining first detection-result information obtained as a result of the character candidate detection processing executed by the text-line detector incorporated in the information processing apparatus of the embodiment.

FIG. 8 is a schematic view for explaining Hough voting.

FIG. 9 is a schematic view for explaining a framing phase.

FIG. 11 is a schematic view for explaining icons used by the information processing apparatus of the embodiment to indicate a position/attitude variation.

FIG. 12 is a schematic view for explaining a user interface that enables change of a threshold set in a stationary-state detector incorporated in the information processing apparatus of the embodiment.

FIG. 14 is a schematic view for explaining an example case where an image of a wide capture target area is captured by moving an image capture range at a constant-velocity.

DETAILED DESCRIPTION

Figure 3:
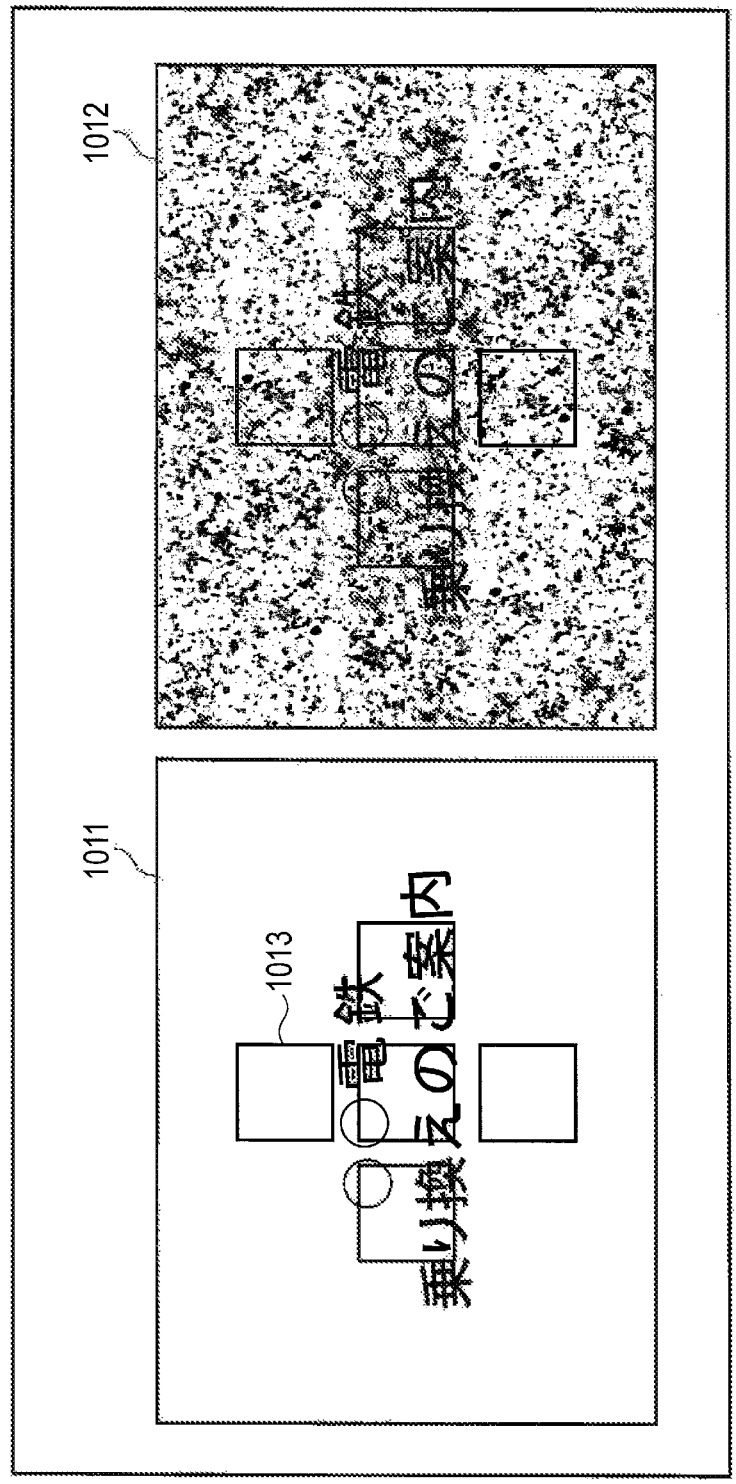
FIG. 3 is a view showing a layout example of a measurement window for an image.

In general, according to one embodiment, an information processing apparatus includes an image processor, a hardware processor and a controller. The image processor acquires an image. The hardware processor detects a first region in the image that includes a character and that detects a second region in the image that includes a text-line comprising at least a particular number of first regions. The second region is detected based at least in part on the detection of the first region. The hardware processor detects a variation in position and attitude of a camera at a time when the image is shot. The controller causes the hardware processor to detect the second region in the image when the variation is less than or equal to a threshold. The controller changes a setting of the hardware processor associated with the detection of at least one of the first region and the second region and causes the hardware processor to detect the second region in the image when the second region is not detected by the hardware processor.

FIG. 1 is a block diagram showing a configuration example of an information processing apparatus according to an embodiment. As shown in FIG. 1, an information processing apparatus 10 comprises a controller 100, an image acquisition module 101, a stationary-state detector 102, an image-analysis/setting module 103, a character detection dictionary storage unit 104, a text-line detector 105, an application module 106, an output module 107, etc. In the embodiment, description will be given assuming a case where the information processing apparatus 10 is a tablet device.

FIG. 2 is a flowchart showing an operation example of the information processing apparatus 10. As shown in FIG. 2, the information processing apparatus 10 executes processing comprising image acquisition processing step S1, stationary-state detection processing step S2, initial setting processing step S3, character-candidate/text-line detection processing step S4, success/failure determination processing step S5, application processing step S6, preview-display processing step S7, changeability determination processing step S8, and setting-change processing step S9.

The controller 100 executes control for organically operating each component of the information processing apparatus 10 (the image acquisition module 101, the stationary-state detector 102, the image-analysis/setting module 103, the character detection dictionary storage unit 104, the text-line detector 105, the application module 106 and the output module 107). In other words, each component of the information processing apparatus 10 operates under control of the controller 100.

The image acquisition module 101 acquires an image shot by an imaging module, such as a camera, installed in the information processing apparatus 10 (image acquisition processing step S1 of FIG. 2). In the embodiment, a character written on a signboard, an indicator, a paper sheet, etc, is assumed as an imaging (image capture) target. Further, the imaging module may be a basic unit secured to the information processing apparatus 10, or may be an external optional unit detachably attached to the information processing apparatus 10.

The stationary-state detector 102 acquires a position/attitude variation (a variation in position and/or attitude) in the information processing apparatus 10, assumed when an image is shot by the imaging module, from an acceleration sensor or an angular velocity sensor built in the apparatus 10. If the acquired variation is less than or equal to a threshold, the stationary-state detector 102 outputs a trigger for executing initial setting processing step S3, described later (Yes in stationary-state detection processing step S2). The position/attitude variation indicates how fast the information processing apparatus 10 (more specifically, the imaging module installed in the information processing apparatus 10) was performing a translation motion and/or rotating during image capture.

The period in which the position/attitude variation is more than a predetermined value is supposed that framing is being performed. In contrast, if the position/attitude variation becomes less than the predetermined value (this state is called a substantially stationary state), the framing is estimated to be complete. For instance, when the acceleration sensor is used, the magnitude of a velocity vector obtained by time-integration of an acceleration vector that excludes a gravity component can be set as the position/attitude variation. Alternatively, the rotational velocity obtained by, for example, the angular velocity sensor can be regarded as an approximate position/attitude variation that indicates, in particular, a variation in attitude. It is considered that the motion of framing has, as a main component, rotational movement that greatly changes the orientation of the imaging module in a position where the imaging module is set. Therefore, it is considered that the state of framing can be estimated only from the approximate position/attitude variation that indicates the attitude variation. This sensor exhibits a quick response, and the position/attitude variation can be acquired by a small number of calculations.

The stationary-state detector 102 compares the acquired position/attitude variation with a predetermined threshold, and outputs the above-mentioned trigger only when the position/attitude variation is less than or equal to the threshold. When the position/attitude variation is more than the predetermined threshold, the stationary-state detector 102 supplies the output module 107 with a command to cause the same to execute preview display processing, described later (No in stationary-state detection processing step S2).

The embodiment is directed to a case where the stationary-state detector 102 uses a position/attitude variation measured by a sensor module, such as an acceleration sensor. Using a feature that if an image is blurred because the imaging module has a significant position/attitude variation, the contrast value (this is obtained as the difference between a maximum luminance and a minimum luminance) of the image is low, the contrast value of an image acquired by the image acquisition module 101 may be calculated, and a value obtained by subtracting the calculated contrast value from a predetermined constant may be used as the position/attitude variation. Alternatively, the magnitude of a motion vector in an image may be directly calculated as in an optical flow, and, for example, a maximum value in the entire image may be used as the position/attitude variation. In this case, even an information processing apparatus without, for example, an acceleration sensor can directly calculate a position/attitude variation from an image acquired by the image acquisition module 101, thereby executing the above-mentioned processing.

Furthermore, in the embodiment, the trigger is presupposed here that it is output when the position/attitude variation is less than or equal to a predetermined threshold. However, even when the position/attitude variation is less than or equal to predetermined threshold, a blurred image will be obtained if the imaging module is out of focus, which adversely affects character candidate detection processing, described later. For this reason, the trigger may be output on condition that the position/attitude variation is less than or equal to the predetermined threshold, and that the imaging module is in focus. Whether the imaging module is in focus may be determined by analyzing an image, or using status information (including, for example, the driving status of a motor that moves the lens of the imaging module) acquired from the imaging module.

Upon receiving the trigger from the stationary-state detector 102, the image-analysis/setting module 103 analyzes an image acquired by the image acquisition module 101, and determines and outputs an initial parameter value for subsequent character-candidate/text-line detection processing step S4 (initial setting processing step S3 of FIG. 2). When the image-analysis/setting module 103 receives a trigger, it is strongly possible that framing by a user is already completed. At this time, a character has to be contained in the image acquired by the image acquisition module 101. That is, if detecting that the position/attitude variation has reached a value less than or equal to the predetermined threshold after it exceeds the predetermined threshold, the information processing apparatus 10 supposes that the acquired image includes a character, and starts detection of the character.

At this time, the image-analysis/setting module 103 calculates the degrees of complexity in a plurality of measurement windows of different positions (denoted by reference number 1013 in FIG. 3) that are preset for each image, as is shown in FIG. 3. It should be noted that character strings illustrated in FIG. 3 means "xx electric railway Interchange Guide" in Japanese. The degree of complexity may be set to, for example, an edge density (calculated as the average, in the windows, of the absolute values of differentiation operator outputs).

If a character is written on a relatively simple background, such as a signboard (denoted by reference number 1011 in FIG. 3), it can be expected that the degree of complexity is high in a measurement window including a character, and is low in a measurement window including no character. That is, when the degree of complexity does not exceed a predetermined threshold in part of the measurement window, it can be determined that the background is a simple one. In contrast, if a character is written on a background having a complex pattern, such as granite (denoted by reference number 1012 of FIG. 3), it can be expected that the degree of complexity is high in both a measurement window including the character and a measurement window including no character. That is, if the degree of complexity is higher than the predetermined threshold in all measuring windows, it can be determined that the background is a complex one. Thus, it is determined whether a character included in an acquired image is on a simple background or a complex background, and the determination result is output as a parameter. By this structure, in subsequent text-line detection processing step S4, character detection can be executed using a character detection dictionary dedicated thereto. Parameters to be output include a threshold (hereinafter, referred to as the character candidate detection threshold) used to detect a character candidate, and a threshold (hereinafter, referred to as the text-line detection threshold) used to detect a text-line. Predetermined values are set as the initial values of the parameters.

The character detection dictionary storage unit 104 is a storage device that stores character detection dictionaries used by the text-line detector 105.

Upon receiving parameter values from the image-analysis/setting module 103, the text-line detector 105 executes, using the parameter values, character candidate detection processing of detecting, in an image acquired by the image acquisition module 101, an image region that seems a character region as a character candidate region (i.e., an region where a character seems to be written), and executes text-line detection processing of detecting a text-line in the detected character candidate region (character-candidate/text-line detection processing step S4 of FIG. 2).

Referring now to FIG. 4, the character candidate detection processing by the text-line detector 105 will be described in detail.

The text-line detector 105 reads a corresponding character detection dictionary from the character detection dictionary storage unit 104 in accordance with determination as to whether the background output from the image-analysis/setting module 103 is a simple or complex one.

Subsequently, the text-line detector 105 performs reduction processing on the image (input image) acquired by the image acquisition module 101, generates a so-called resolution pyramid image, and performs character candidate detection processing of searching and detecting a character on the resolution pyramid image. More specifically, as shown in FIG. 4, the text-line detector 105 sequentially reduces an input image 201, acquired by the image acquisition module 101, at a constant ratio of r (0<r<1), thereby generating one or more resized images 202 and 203. The number of generated resized images, in other words, the number of executions of the above-mentioned reduction processing, depends on the minimum and maximum sizes, associated with the specifications, of a character to be detected. The size of a detection window 205 shown in FIG. 4 is determined in accordance with the size of a character to be detected on the input image 201 of the highest resolution. That is, the size of the detection window 205 serves as the minimum size, associated with the specifications, of a character to be detected.

Since on the resized images 202 and 203 obtained by multiplying the input image by the constant reduction ratio r, the region covered by the detection window 205 of the same size is relatively larger than in the input image, the size of a detected character is relatively greater on the resized images. The text-line detector 105 generates a resized image until the size of a character to be detected exceeds the maximum size associated with the specifications. Thus, after generating one or more resized images, the text-line detector 105 generates the resolution pyramid image 204 that comprises the input image 201 and the resized images 202 and 203, as is shown in FIG. 4.

After generating the resolution pyramid image 204, the text-line detector 105 generates a plurality of partial images by extracting images within the detection window 205 of the predetermined size in respective positions, while scanning, using the detection window 205, the respective images 201 to 203 included in the generated resolution pyramid image 204. Further, the text-line detector 105 detects character candidates based on the generated partial images and the above-mentioned read character detection dictionary. More specifically, the text-line detector 105 compares each of the above-mentioned partial images with the character detection dictionary, thereby calculating, for the respective partial images, scores indicating degrees of likeness to a character, and determining whether each score exceeds a character candidate detection threshold output from the image-analysis/setting module 103. As a result, it can be determined (estimated) whether each partial image contains a character.

In accordance with the determination result, the text-line detector 105 imparts a first code, indicating a character, to a partial image determined to be a character, and imparts a second code, indicating a non-character, to a partial image determined to be an image including no character (in other words, an image including a non-character). Thus, the text-line detector 105 can detect, as a region including a character, a region where a partial image with the first code exists (in other words, a region where the detection window 205 clipping the partial image with the first code is positioned).

If the number of partial images with the first code is not less than a predetermined threshold after the above-mentioned character candidate detection processing is executed, the text-line detector 105 generates first detection-result information indicating a region on the input image 201 where a character exists. The first detection-result information is information that indicates a region on the input image 201 where a character series is marked by a rectangular frame, as is shown in, for example, FIG. 5. It should be noted that character strings illustrated in FIG. 5 means "character strings" in Japanese.

If the number of the partial images with the first code is less than a predetermined threshold, the text-line detector 105 determines that the above processing has failed in detection of sufficient character candidates, and generates a first command for causing the image-analysis/setting module 103 to execute setting-change processing, described later (No in success determination processing step S5).

Since a score calculation method for estimating the degree of likeness, to a character, of a partial image in the detection window 205 can be realized by a known pattern identification method, such as a partial space method or a support vector machine, no detailed description will be given thereof.

When the first detection-result information is generated, the text-line detector 105 performs text-line detection processing of detecting a row of characters written in an image acquired by the image acquisition module 101, based on the first detection-result information. The text-line detection processing is a processing for detecting a linear arrangement of character candidates, using linear Hough transform.

Figure 6:
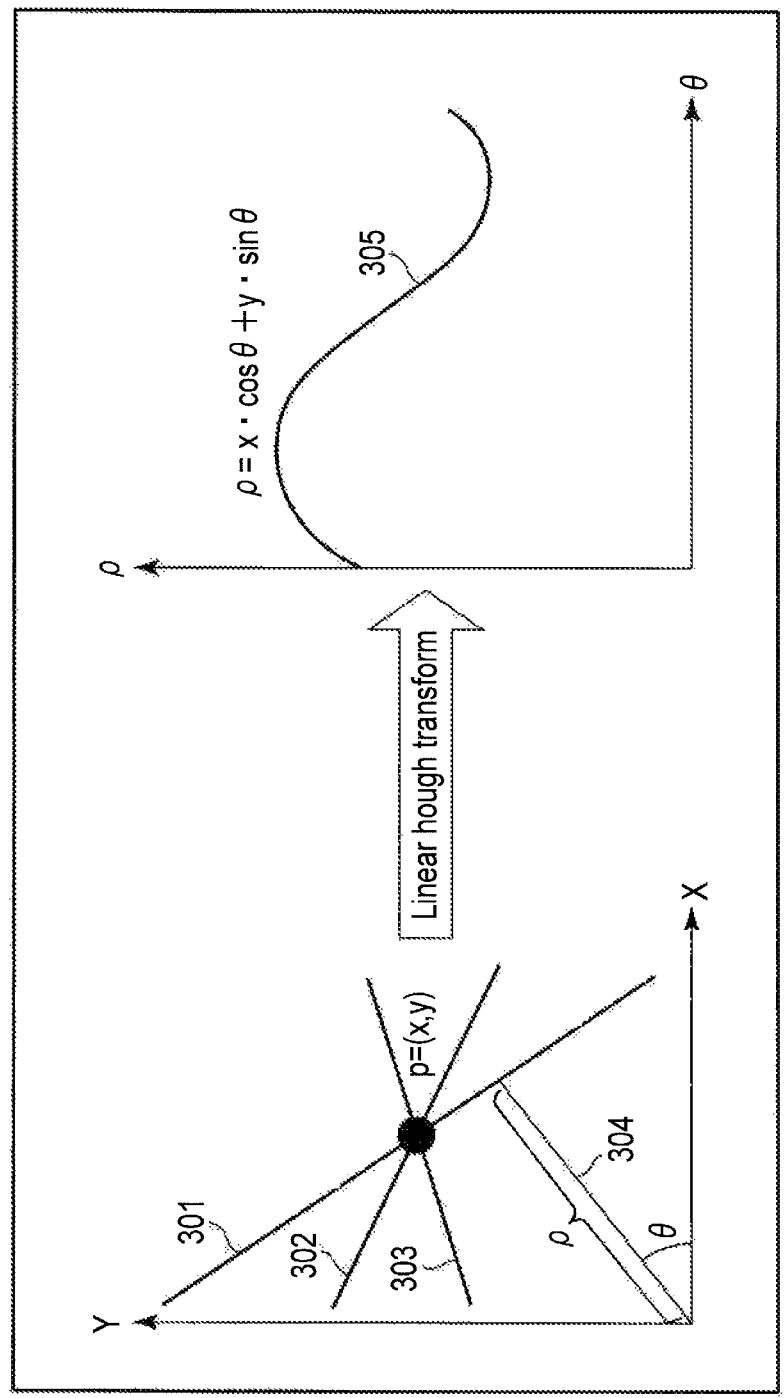
FIG. 6 is a schematic view for explaining the principle of linear Hough transform.

Referring first to FIG. 6, a description will be given of the principle of linear Hough transform.

Before describing the principle of linear Hough transform, a Hough curve will be described. As shown in FIG. 6, there exist an infinite number of straight lines that pass through a point p (x, y) on two-dimensional coordinates, as is denoted by, for example, reference numbers 301 to 303. However, if it is defined that the inclination of a normal 304 dropped to each straight line from an origin O is θ with respect to the x-axis, and that the length of the normal 304 is ρ, θ and ρ corresponding to one straight line are determined uniquely. According to this scheme, it is known that combinations of θ and ρ, which uniquely determine respective ones of the infinite number of straight lines passing through a certain point (x, y), draw a unique locus 305 (ρ=x·cos θ+y·sin θ) in accordance with values (x, y) in θρ coordinates. The locus 305 is generally called the Hough curve.

Linear Hough transform means transform of a straight line, which can pass through (x, y) coordinates, into a Hough curve drawn by (θ, ρ) uniquely determined as described above. Suppose here that θ assumes a positive value if the straight line that can pass through (x, y) is inclined leftward, assumes 0 if it is perpendicular, and assumes a negative value if it is inclined rightward. Suppose also that the domain of definition does not depart from −π<θ≤π.

Figure 7:
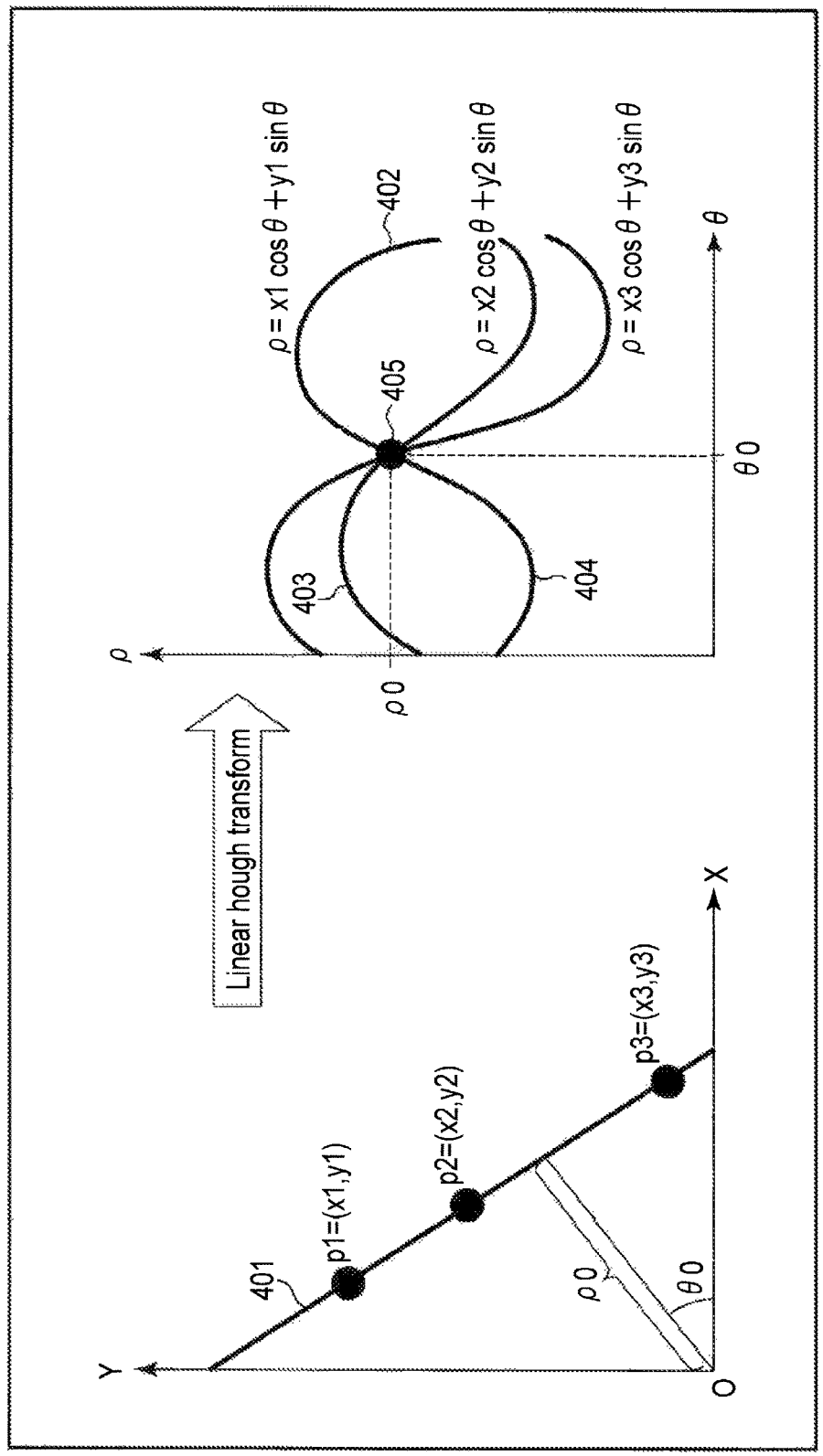
FIG. 7 is another schematic view for explaining the principle of linear Hough transform.

Hough curves can be obtained for respective points on the xy coordinates independently of each other. As shown in, for example, FIG. 7, straight line 401 passing through three points p1 to p3 can be obtained as a straight line determined from the coordinates (θ0, ρ0) of point 405 where Hough curves 402 to 404 corresponding to p1 to p3 intersect. The larger the number of points through which a straight line passes, the larger the number of Hough curves passing through the positions indicated by θ and ρ that represent the straight line. That is, it can be said that linear Hough transform is useful in explaining detecting a straight line from a group of points.

When detecting a straight line from a group of points, an engineering technique called Hough voting is used. In this technique, combinations of θ and ρ through which each Hough curve passes are voted in a two-dimensional Hough voting space formed of coordinate axes of θ and ρ, thereby suggesting existence of combinations of θ and ρ through which a large number of Hough curves pass, i.e., the existence of a straight line passing through a large number of points, in a position in the Hough voting space, where a large number of votes are obtained. In general, first, a two-dimensional arrangement (Hough voting space) having a size corresponding to a necessary search range of θ and ρ is prepared, and the number of votes is initialized to 0. Subsequently, a Hough curve corresponding to a point is obtained by the above-described Hough transform, and the value of an arrangement through which this Hough curve passes is incremented by one.

This processing is generally called a Hough vote. If the above-mentioned Hough voting is executed on all points, it can be understood that in a position where the number of votes is 0 (i.e., no Hough curve passes), no straight line exists, that in a position where only one vote is obtained (i.e., one Hough curve passes), a straight line passing through one point exists, that in a position where two votes are obtained (i.e., two Hough curves pass), a straight line passing through two points exists, and that in a position where n votes are obtained (i.e., one Hough curves pass), a straight line passing through n points exists. That is, a straight line which passes through two or more points on the xy coordinates appears as a place where two or more votes are obtained in the Hough voting space.

If the resolution of the Hough voting space can be made infinite, only a point, through which a number of loci pass, obtains votes corresponding to the number of the loci. However, since the actual Hough voting space is quantized at a certain resolution associated with θ and ρ, positions around a position where a plurality of loci intersect will also have a high voting distribution. In light of this, the position where a plurality of loci intersect is detected by detecting a position of a local maximum value in the voting distribution of the Hough voting space.

Referring then to FIG. 8, a detailed description will be given of the above-described linear Hough transform and text-line detection processing using the Hough voting. Suppose here that an image plane indicating an input image is a coordinate plane 501 having a horizontal axis x and a vertical axis y.

When the coordinates of the center of the character candidate 502 is (x, y), an infinite number of straight lines pass through the center. These straight lines always satisfy the above-mentioned linear Hough transform formula (ρ=x·cos θ+y·sin θ). As described above, ρ and θ represent the length of a normal dropped to each straight line from the origin O, and the inclination of the normal with respect to the x-axis, respectively. That is, the values of (θ, ρ) that satisfy the straight lines passing through the point (x, y) provide a Hough curve in the θρ coordinate system. A straight line passing through two different points can be expressed by a combination of (θ, ρ) where Hough curves associated with the two points intersect. The text-line detector 105 obtains Hough curves associated with the centers of a plurality of character candidates detected by the text-line detector 105, and detects a combination of (θ, ρ) where Hough curves intersect. This means that the text-line detector 105 detects a straight line of a large number of channel candidates, namely, the existence of a text-line.

In order to detect a combination of (θ, ρ) where a large number of Hough curves intersect, the text-line detector 105 votes, in the Hough voting space, a Hough curve calculated from the center coordinates of each character candidate. As shown in FIG. 8, in the Hough voting space, ρ represents the vertical axis, and θ represents the horizontal axis, and a plurality of Hough voting spaces as denoted by reference numbers 503 to 505 are prepared in accordance with the size s of the character candidates 502. If the character candidate 502 has a small size, it is voted in a Hough voting space 503 of a small size s, while if the character candidate 502 has a larger size, it is voted in a Hough voting space of a larger size s. In each Hough voting space, the text-line detector 105 detects a straight line defined by a local maximum position (θ, ρ) where the number of votes is not less than a text-line detection threshold output from the image-analysis/setting module 103, and detects, as the text-line, a set of character candidates associated with this straight line.

In addition, when detecting, in association with one Hough curve, a plurality of straight lines defined by a local maximum position (θ, ρ) where the number of votes is not less than the text-line detection threshold, the text-line detector 105 detects, as the text-line, a set of character candidates associated with a straight line with a largest number of votes. For example, if a text-line detection threshold is 2, in the Hough voting space 503 of FIG. 8, a local maximum position 506 with 3 votes, scoring over other local maximum positions with 2 votes, is detected as the text-line by the text-line detector 105. Further, in a Hough voting space 505 of FIG. 8, a local maximum position 507 with 2 votes is detected as the text-line by the text-line detector 105. That is, two straight lines corresponding to local maximum positions 506 and 507 are detected from an input image. When the straight lines are detected, the text-line detector 105 extracts character candidates associated with each straight line, and detects a text-line as a region that covers the character candidates.

If local maximum positions detected in different Hough voting spaces of sizes s close to each other are adjacent to each other within a predetermined distance, the text-line detector 105 determines that the same text-line has been detected in different ways, thereby detecting one text-line from sets of character candidates associated with the two local maximum positions.

Returning to FIG. 1 and FIG. 2, the text-line detector 105 supplies the application module 106 with second detection-result information indicating a region that includes one or more text-lines, if detecting the one or more text-lines as a result of the above-mentioned text-line detection processing (Yes in success determination processing step S5). In contrast, if no text-line is detected as a result of the above-mentioned text-line detection processing, the text-line detector 105 outputs a second command to cause the image-analysis/setting module 103 to execute setting-change processing, described later, (No in success determination processing step S5).

The image-analysis/setting module 103 will be described again. Upon receipt, from the text-line detector 105, of the first or second command that commands execution of setting-change processing, the image-analysis/setting module 103 determines whether parameter change is possible (changeability determination processing step S8). If change is possible, the image-analysis/setting module 103 changes parameter value and outputs it (setting-change processing step S9 of FIG. 2). Upon receipt of the changed parameter value, the text-line detector 105 executes character-candidate/text-line detection processing step S4 in accordance with the new parameter value.

Reception of the first command by the image-analysis/setting module 103 means that the text-line detector 105 could not detect a sufficient number of character candidates. In this case, it is strongly possible that the above-mentioned character candidate detection threshold is too high. Therefore, the image-analysis/setting module 103 determines whether processing can be repeated, with the current character candidate detection threshold lowered (changeability determination processing step S8). This determination is made according to two conditions. The first condition is whether the current character candidate detection threshold has reached a predetermined lower limit. The second condition is whether the number of setting changes executed on an acquired image has reached a predetermined upper limit.

If at least one of the conditions is satisfied (No in changeability determination processing step S8), the image-analysis/setting module 103 stops further repetition of character-candidate/text-line detection processing step S4, and supplies the output module 107 with a command for causing the output module 107 to execute a preview display of an acquired image superimposed with information that requests the user to perform re-framing. In contrast, if neither of the conditions is satisfied (Yes in changeability determination processing step S8), the image-analysis/setting module 103 determines a new threshold by subtracting a predetermined value from the current character candidate detection threshold, and outputs the determined value as an updated character candidate detection threshold.

Further, reception of the second command by the image-analysis/setting module 103 means that the text-line detector 105 could not detect a text-line. In this case, it is strongly possible that the above-mentioned text-line detection threshold is too high. Therefore, the image-analysis/setting module 103 determines whether processing can be repeated, with the current text-line detection threshold lowered (changeability determination processing step S8). This determination is made according to two conditions. The first condition is whether the current text-line detection threshold has reached a predetermined lower limit. The second condition is whether the number of setting changes executed on an acquired image has reached a predetermined upper limit.

If at least one of the conditions is satisfied (No in changeability determination processing step S8), the image-analysis/setting module 103 stops further repetition of character-candidate/text-line detection processing step S4, and supplies the output module 107 with a command for causing the output module 107 to execute a preview display of an acquired image superimposed with data that requests the user to perform re-framing. In contrast, if neither of the conditions is satisfied (Yes in changeability determination processing step S8), the image-analysis/setting module 103 determines a new threshold by subtracting a predetermined value from the current text-line detection threshold, and outputs the determined value as an updated text-line detection threshold.

Although in the embodiment, both the character candidate detection threshold and the text-line detection threshold are set adaptively changeable, only one of the thresholds may be set adaptively changeable.

Moreover, since in the information processing apparatus 10 of the embodiment, both the character candidate detection threshold and the text-line detection threshold can be adaptively changed as described above, initial-setting processing step S3 by the image-analysis/setting module 103 may be omitted to enable the text-line detector 105 to execute, using, for example, an initial parameter set for selecting a versatile character detection dictionary, character-candidate/text-line detection processing step S4 immediately when a trigger is output from the stationary-state detector 102.

Upon receipt of the second detection-result information from the text-line detector 105, the application module 106 executes processing (application processing step S6 of FIG. 2) unique to an application pre-installed. For instance, if an application (for example, an application with an OCR function) capable executing character recognition processing is pre-installed, the application module 106 extracts an image pattern in a region with a text-line designated by the second detection-result information, and executes character recognition processing on the extracted image pattern of the text-line, thereby acquiring a character code sequence corresponding to the text-line in the region.

If characters in an image are recognized by, for example, OCR, the application module 106 can also retrieve information associated with the recognized character code sequence. More specifically, information indicating a price or specifications of an article may be retrieved based on the name of the article, map information may be retrieved based on the name of a place or a beauty spot, or a certain language may be translated into another. Processing result information indicating the result of the processing executed by the application module 106 is output to the output module 107.

The output module 107 superimposes the processing result from the application module 106 on the image acquired from the image acquisition module 101, and executes preview-display processing for displaying the resultant information on the display of the information processing apparatus 10. Furthermore, upon receipt of a command to execute the preview-display processing from a component different from the application module 106, the output module 107 executes preview display processing of at least directly displaying an input image on the display, in accordance with the command.

Referring then to FIG. 9, a framing phase will be described.

The framing phase is a period ranging from the time when the user starts to move the information processing apparatus 10 (imaging module) toward a character string as an image capture target, to the time when an image from which the user tries to obtain a desired character recognition result or translation result as the purpose of framing (i.e., an image from which a desired result is obtained by processing the image), is acquired by, for example, a display output. The framing phase can be roughly divided into three stages. In the first stage, the information processing apparatus 10 is moved by a large amount toward a character string as an image capture target (hereinafter, referred to as the coarse adjustment phase), as is shown in diagram (a) of FIG. 9.

In the coarse adjustment phase, since blurring occurs in an image because of the large movement of the information processing apparatus 10, no character candidate is detected as shown in diagram (a) of FIG. 9, even if character candidate detection processing is executed. In the second stage, the information processing apparatus 10 is decelerated in order to make the character string as the image capture target fall within an image capture range (hereinafter, referred to as the fine adjustment phase), as is shown in diagram (b) of FIG. 9. In the fine adjustment phase, since the information processing apparatus 10 starts to be decelerated, and blurring occurs in an image, a character candidate may be detected or may not be detected even if character candidate detection processing is executed. Moreover, a character string as an image capture target may fall outside the image capture range. In the third stage, the character string as the image capture target completely falls within the image capture range (hereinafter, referred to as framing completion), as is shown diagram (c) of FIG. 9. At this time point and later, the information processing apparatus 10 (imaging module) is substantially stationary, although fine movement may occur because of slight hand shaking. On framing completion, the character string as the image capture target is positioned at the center of the image ideally. In order to detect framing completion, the stationary-state detector 102 performs threshold processing for a position/attitude variation.

Figure 10:
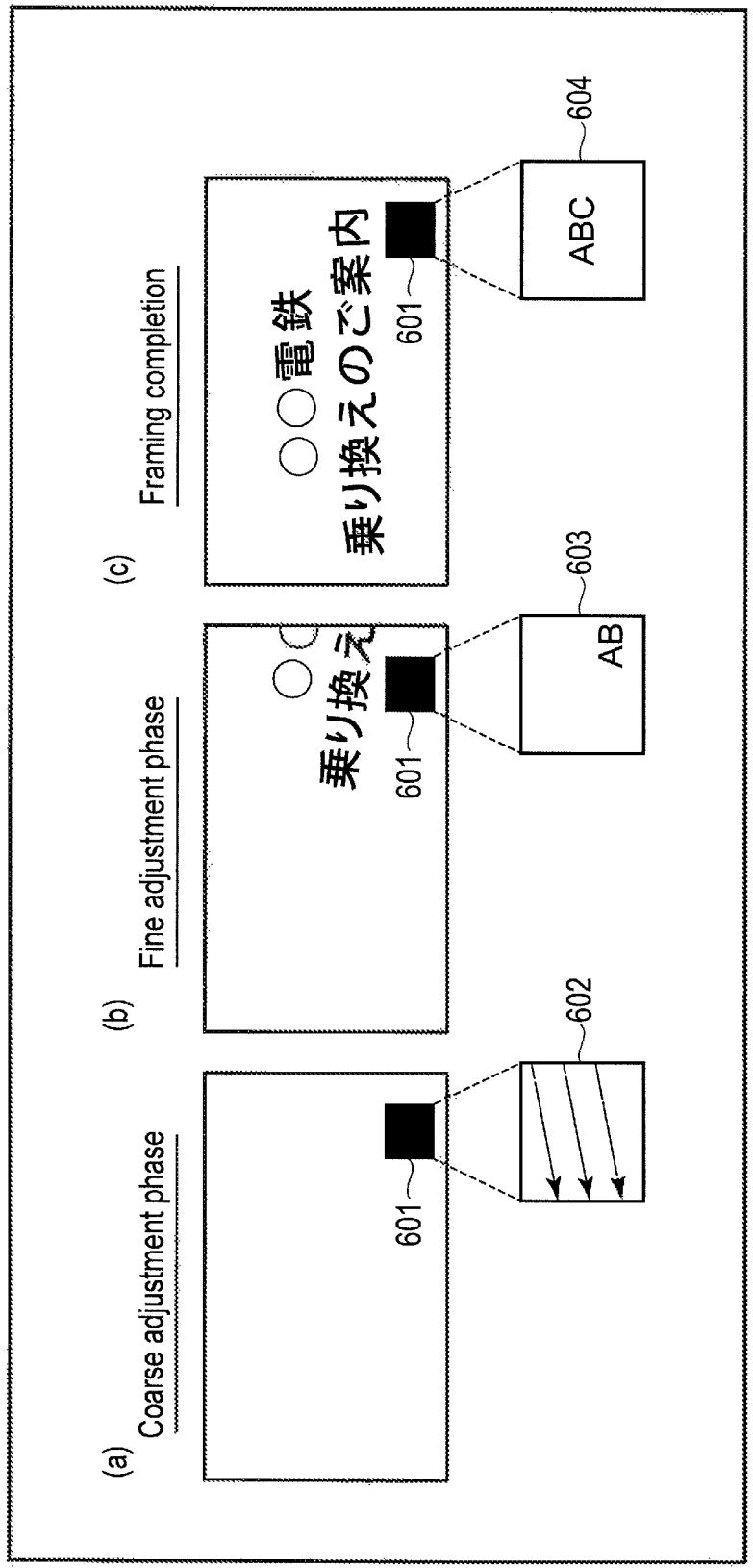
FIG. 10 is a schematic view for explaining icons used by the information processing apparatus of the embodiment to indicate the state of framing.

Referring then to FIG. 10, various icons for indicating framing states will be described. As already described with reference to FIG. 9, the period ranging from the start of framing to the end of framing includes three stages: (1) coarse adjustment phase, (2) fine adjustment phase, and (3) framing completion. Since differences between the three stages are indicated to the user through a preview display by the output module 107, the user can accurately ascertain the state of framing and hence can perform more exact framing.

Diagram (a) of FIG. 10 is a schematic diagram, showing an example of an icon indicating stage (1) to the user. If the current stage is stage (1), namely, the coarse adjustment phase in FIG. 9, icon 602 indicating that the current stage is the coarse adjustment phase is displayed in an icon display area 601 on the display of the information processing apparatus 10. Diagram (a) of FIG. 10 shows a case where icon 602, which consists of arrows that represent the movement of the user of the information processing apparatus 10, and hence indicate the large movement the information processing apparatus 10, is displayed as an icon indicating the coarse adjustment phase. The icon indicating the coarse adjustment phase is not limited to the illustrated design. For example, a simple text string "Coarse adjustment" may be displayed. However, it is more desirable that the icon is of a design that enables the user to easily ascertain that the current stage is the coarse adjustment phase.

Diagram (b) of FIG. 10 is a schematic diagram, showing an example of an icon indicating stage (2) to the user. If the current stage is stage (2), namely, the fine adjustment phase in FIG. 9, icon 603 indicating that the current stage is the fine adjustment phase is displayed in the icon display area 601 on the display of the information processing apparatus 10. Diagram (b) of FIG. 10 shows a case where icon 603, which expresses that the image capture target starts to enter the image capture range of the information processing apparatus 10, is displayed as an icon indicating the fine adjustment phase. The icon indicating the fine adjustment phase is not limited to the illustrated design. For example, a simple text string "Fine adjustment" may be displayed. However, it is more desirable that the icon is of a design that enables the user to easily ascertain that the current stage is the fine adjustment phase.

FIG. 10 (c) is a schematic diagram, showing an example of an icon indicating stage (3) to the user. If the current stage is stage (2), namely, framing completion in FIG. 9, icon 604 indicating that the current stage is framing completion is displayed in the icon display area 601 on the display of the information processing apparatus 10. Diagram (c) of FIG. 10 shows a case where icon 604, which indicates that the image capture target has entered (currently falls within) the image capture range of the information processing apparatus 10, is displayed as an icon indicating framing completion. The icon indicating framing completion is not limited to the illustrated design. For example, a simple text string "Framing completion" may be displayed. However, it is more desirable that the icon is of a design that enables the user to easily ascertain that the current stage is framing completion.

Although FIG. 10 is directed to the cases where icons indicating respective stages (1) to (3) described above are displayed, sounds or voices corresponding to the three stages may be output from the output module 107.

Further, not only stages (1) to (3) described above are indicated to the user, but also the above-mentioned position/attitude variation can also be indicated to the user, using a graph superimposed on the preview display output from the output module 107. Furthermore, the positions of character candidates or text-line detected by the text-line detector 105 can further be indicated to the user, using, for example, a frame. Referring then to FIG. 11, a graph icon indicating the position/attitude variation will be described.

FIG. 11 is a schematic view showing an example of the graph icon indicating the position/attitude variation. Icon 701 imitating a graph (in this example, a bar graph) indicating the position/attitude variation is displayed on the graph display area on the display of the information processing apparatus 10. Icon 701 includes two objects 702 and 703. Object 702 indicates a position/attitude variation calculated by the stationary-state detector 102. Object 703 indicates a threshold preset in the stationary-state detector 102. That is, from FIG. 11, the user can visually understand that the position/attitude variation calculated by the stationary-state detector 102 is less than the preset threshold (that is, a trigger is output) If the position/attitude variation is less than the preset threshold (that is, the trigger is output), the user can more easily understand that the trigger is output, if the color and/or brightness of the graph is changed from that in a case where the variation exceeds the preset threshold.

When the user cannot obtain a good result of detection, recognition and/or translation of a text-line, they can more accurately estimate whether its cause is the coarse adjustment phase, or failure of character candidate detection due to the distance of a target character or the skew of the character, if the position/attitude variation is indicated to them as shown in FIG. 11.

Furthermore, if the display of the information processing apparatus 10 is a touchscreen display including a touchpanel, it may be modified such that a touch operation to horizontally move, on the touchscreen display, object 703 in icon 701 displayed on the above-mentioned graph display area is received, thereby enabling the user to arbitrarily change the threshold set in the stationary-state detector 102, as is shown in FIG. 12. By virtue of this user interface function, even a user, who cannot easily hold the information processing apparatus 10 substantially stationary, and hence cannot easily obtain a good result of detection, recognition and/or translation of a text-line because they cannot easily detect a framing-completed time, may well obtain a good result of detection, recognition and/or translation of the text-line, if the threshold indicated by object 703 is raised to thereby make it easy to detect the framing-completed time.

In the above description, the stationary-state detector 102 does not execute image acquisition processing after processing (S3 to S9 in FIG. 2) subsequent to initial setting processing is started, until image acquisition processing of step S1 is resumed. In consideration of possibility of user's re-attempting framing in mid-flow, the stationary-state detector 102 continues stationary-state detection processing of step S2 of FIG. 2 in the background, even after the processing (S3 to S9 in FIG. 2) subsequent to the initial setting processing is started.

Accordingly, the above processing may be modified such that when the position/attitude variation exceeds the threshold, the output of the trigger is immediately stopped to interrupt the processing (S3 to S9 in FIG. 2) subsequent to the initial setting processing, thereby causing the program to proceed to step S7 in order to directly preview-display the acquired image. By this processing, when the user again starts to move the information processing apparatus in order to re-attempt framing, processing can be started from a state before the output of the trigger, in accordance with the re-attempt.

At this time, instead of executing the initial setting processing immediately after receiving a trigger from the stationary-state detector 102, the image-analysis/setting module 103 may execute the initial setting processing when still receiving the trigger after a predetermined period (for example, about 0.5 seconds) elapses since then. By virtue of this structure, when an action (for example, the information processing apparatus 10 is moved a large amount) for revoking the trigger has been performed immediately after the output of the trigger from the stationary-state detector 102, useless initial setting or text-line detection processing is prevented from execution, advantageously.

Figure 13:
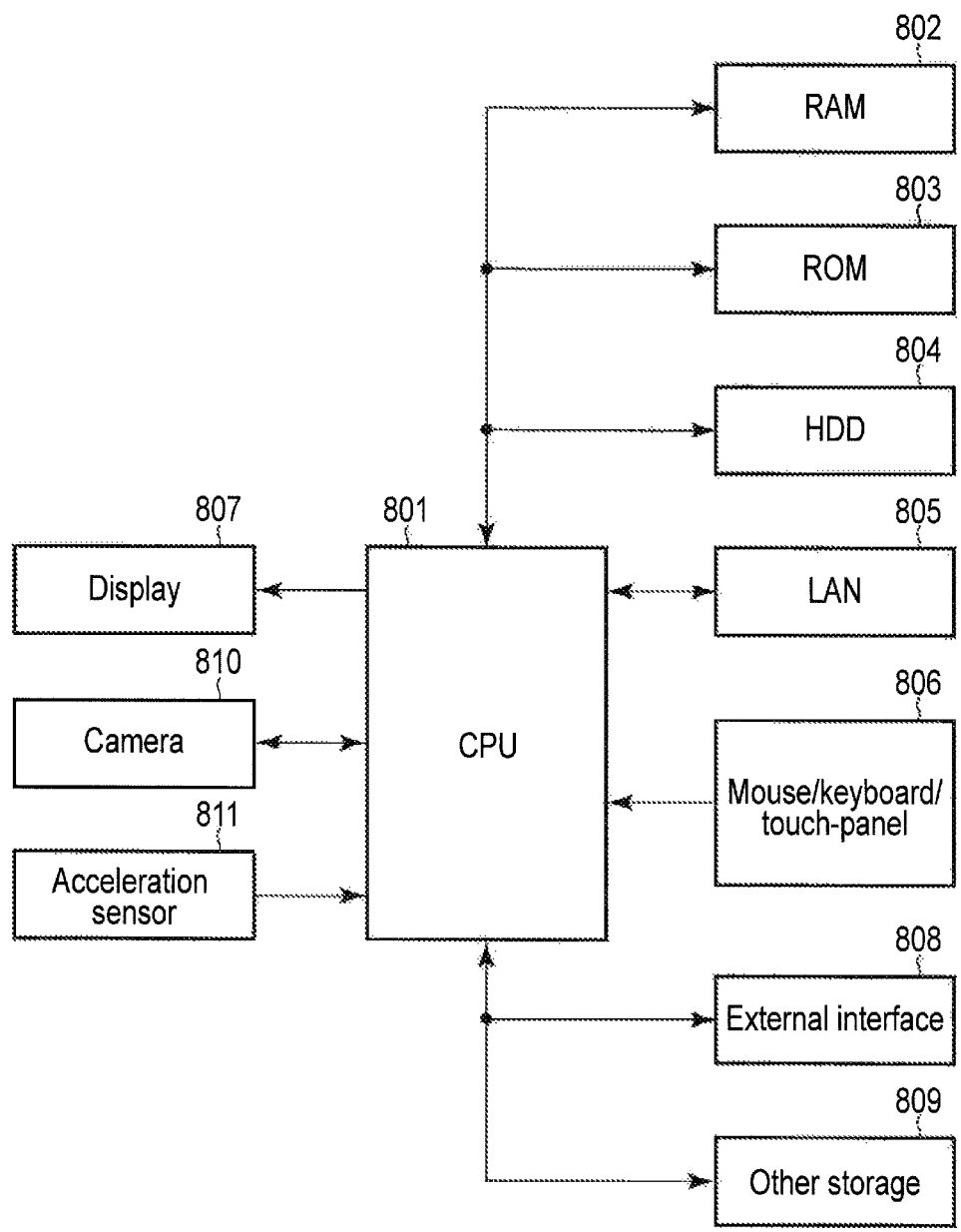
FIG. 13 is a block diagram showing a hardware configuration example of the information processing apparatus of the embodiment.

Referring next to FIG. 13, a hardware configuration example of the information processing apparatus 10 will be described.

FIG. 13 shows a hardware configuration example of the information processing apparatus 10. As shown in FIG. 13, the information processing apparatus 10 comprises a CPU 801, a RAM 802, a ROM 803, an HDD 804, a LAN 805, an input device 806, a display 807, an external interface 808, an external storage device 809, a camera 810, an acceleration sensor 811, etc.

The CPU 801 is a processor for controlling the components of the information processing apparatus 10. The CPU 801 executes a text-line detection program loaded to the RAM 802 from the HDD 804. By executing the text-line detection program, the CPU 801 can function as a processing module configured to execute the above-described information processing. The CPU 801 can also load a text-line detection program from the external storage device 809 (such as a flash drive) to the RAM 802, thereby executing the program. Not only the text-line detection program, but also images used during information processing, can be loaded from the external device 809.

The input device 806 is, for example, a keyboard, a mouse, a touch-panel, or one of other various types of input devices. The display 807 is a device capable of displaying results of various types of processing executed by the information processing apparatus 10. The camera 810 corresponds to the above-described imaging module, and can capture images serving as targets of information processing. As described above, the camera 810 may be a basic unit secured to the information processing apparatus 10, or may be an optional external unit detachably attached to the information processing apparatus 10. The acceleration sensor 811 is a device capable of acquiring a degradation estimation value.

In the above-described embodiment, only when framing is completed and possibility of existence of a character is determined high, the initial setting processing and the character-candidate/text-line detection processing are executed. Further, if no text-line is detected, the character-candidate detection threshold or the text-line detection threshold is adaptively changed. This enables a character string to be reliably detected in an acquired image, without reject setting, where excessive detection little occurs, performed under strict conditions. In addition, since the character-candidate detection threshold or the text-line detection threshold is adaptively changed as described above, initial setting processing including image analysis (for, for example, selecting a character device dictionary) can be omitted.

By the way, when a character as an image capture target is positioned too far, this may be regarded as a factor of prohibiting acquisition of a good result of text-line detection, recognition and/or translation. For instance, when a capture target area is wide, if an image which includes the entire image-capture target area is obtained at a distance to enable the entire image capture target area to be received in the image capture range, characters as image capture targets are at a far distance, and hence it is strongly possible that a good result of detection, recognition and/or translation of a text-line cannot be obtained. Therefore, the user has to execute a number of framing operations in order to divide one image capture target area 901 into a plurality of image capture ranges 902A, 902B and 902C, as is shown in diagram (a) of FIG. 14.

In light of the above circumstances, when image capture range 902D is moving at a constant velocity as shown in, for example, diagram (b) of FIG. 14, the information processing apparatus 10 may determine that the user intends to set the entire moving area of image capture range 902D as the image capture target area 901, thereby starting detection, recognition and/or translation of a text-line. In this case, it is sufficient if the user executes one framing operation of moving image capture range 902D at a constant velocity from one end to the other of the image capture area 901.

The constant-velocity movement of image capture range 902D can be detected, assuming that the information processing apparatus 10 is in a constant-velocity motion state. Therefore, the stationary-state detector 102 outputs the second trigger (which can be discriminated from the aforementioned trigger), based on the position/attitude variation acquired as described above, more specifically, when the direction and length of a velocity vector calculated from the value of the acceleration sensor are substantially constant.

When the second trigger is output, the controller 100, for example, makes the image acquisition module 101 (or imaging module) continuously acquire images at intervals shorter than usual.

Moreover, when the second trigger is output, the controller 100 sets a character detection dictionary dedicated to blurred characters (i.e., a character detection dictionary having learned blurred characters) as a character detection dictionary used by the text-line detector 105. The text-line detector 105 performs the above-mentioned character-candidate detection processing and text-line detection processing on the images continuously acquired using the character detection dictionary dedicated to detection of blurred characters.

Yet further, the information processing apparatus may be modified such that it has an image processing function for correcting blurred images, such as blind de-convolution, and when the second trigger is output, the controller 100, for example, executes the image processing function on a character candidate, a text-line or a partial image including them, detected by the text-line detector 105.

While certain embodiments have been described, these embodiments have been presented by way of example only, and are not intended to limit the scope of the inventions Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus comprising:
   an image processor that acquires an image;
   a hardware processor that:
      detects a first region in the image that includes a character and that detects a second region in the image that includes a text-line comprising at least a particular number of first regions, the second region detected based at least in part on the detection of the first region; and
      detects a variation in position and attitude of a camera at a time when the image is shot; and
   a controller that causes the hardware processor to detect the second region in the image when the variation is less than or equal to a threshold,
   wherein the controller changes a setting of the hardware processor associated with the detection of at least one of the first region and the second region and causes the hardware processor to detect the second region in the image when the second region is not detected by the hardware processor,
   wherein the hardware processor analyzes the image to determine a setting to detect at least one of the first region and the second region in the image,
   wherein the controller causes the hardware processor to determine the setting before execution of the detection of the second region in the image and configures the setting as an initial setting when the variation is less than or equal to the threshold,
   wherein the controller instructs the camera which sequentially obtains images to reduce intervals between obtaining the images when it is determined based on the variation that the camera is in a moving state of a substantially constant velocity, and
   wherein the controller:
      sets a first dictionary as a character detection dictionary used by the hardware processor to detect the first region in the image when it is determined based on the variation that the camera is in a substantially stationary state; and
      sets a second dictionary that is different from the first dictionary as the character detection dictionary when it is determined based on the variation that the camera is in a moving state of a substantially constant velocity.

2. The information processing apparatus of claim 1, further comprising a user interface that displays a particular icon on a touchscreen display and changes the threshold when a particular touch operation is performed on the touchscreen display, the particular icon visually illustrating the variation while comparing the threshold, the particular icon comprising a first object indicative of the variation and a second object indicative of the threshold, the particular touch operation being a touch operation to move the second object.

3. The information processing apparatus of claim 1, wherein the image processor corrects blurring in the image,
   wherein the controller causes the image processor to correct blurring in the image or in a partial image corresponding to the first region or the second region when it is determined based on the variation that the camera is in the moving state of the substantially constant velocity.

4. The information processing apparatus of claim 1, wherein the hardware processor analyzes the image to determine whether the imaging module is in focus at the time when the image is shot,
   wherein the controller causes the hardware processor to detect the second region in the image when the determination module determines that the camera is in focus at the time when the image is shot.

5. The information processing apparatus of claim 4, wherein the image processor corrects blurring in the image,
   wherein the controller causes the image processor to correct blurring in the image or in a partial image corresponding to the first region or the second region when it is determined based on the variation that the camera is in the moving state of the substantially constant velocity.

6. The information processing apparatus of claim 1, wherein the image processor acquires information that enables a determination as to whether the camera is in focus at the time when the image is shot,
   wherein the controller causes the hardware processor to detect the second region in the image when it is determined based on the information that the camera is in focus at the time when the image is shot.

7. An information processing apparatus comprising:
   an image processor that acquires an image;
   a hardware processor that:
      detects a first region in the image that includes a character and that detects a second region in the image that includes a text-line comprising at least a particular number of first regions, the second region detected based at least in part on the detection of the first region; and
      detects a variation in position and attitude of a camera at a time when the image is shot; and a controller that causes the hardware processor to detect the second region in the image when the variation is less than or equal to a threshold, wherein the controller changes a setting of the hardware processor associated with the detection of at least one of the first region and the second region and causes the hardware processor to detect the second region in the image when the second region is not detected by the hardware processor, wherein the hardware processor analyzes the image to determine a setting to detect at least one of the first region and the second region in the image, wherein the controller causes the hardware processor to determine the setting before execution of the detection of the second region in the image and configures the setting as an initial setting when the variation is less than or equal to the threshold, and wherein the controller:
sets a first dictionary as a character detection dictionary used by the hardware processor to detect the first region in the image when it is determined based on the variation that the camera is in a substantially stationary state; and
sets a second dictionary different from the first dictionary as the character detection dictionary when it is determined based on the variation that the camera is in a moving state of a substantially constant velocity.

8. The information processing apparatus of claim 7, wherein the image processor corrects blurring in the image,
wherein the controller causes the image processor to correct blurring in the image or in a partial image corresponding to the first region or the second region, when it is determined based on the variation that the camera is in the moving state of the substantially constant velocity.

9. The information processing apparatus of claim 7, further comprising a user interface that displays a particular icon on a touchscreen display and changes the threshold when a particular touch operation is performed on the touchscreen display, the particular icon visually illustrating the variation while comparing the threshold, the particular icon comprising a first object indicative of the variation and a second object indicative of the threshold, the particular touch operation being a touch operation to move the second object.

10. The information processing apparatus of claim 9, wherein the image processor corrects blurring in the image,
wherein the controller causes the image processor to correct blurring in the image or in a partial image corresponding to the first region or the second region when it is determined based on the variation that the camera is in the moving state of the substantially constant velocity.

11. The information processing apparatus of claim 7, wherein the controller instructs the camera which sequentially obtains images to reduce intervals between obtaining images when it is determined based on the variation that the camera is in a moving state of a substantially constant velocity.

12. The information processing apparatus of claim 11, wherein the image processor corrects blurring in the image,
wherein the controller causes the image processor to correct blurring in the image or in a partial image corresponding to the first region or the second region when it is determined based on the variation that the camera is in the moving state of the substantially constant velocity.

13. An information processing apparatus comprising:
an image processor that acquires an image;
a hardware processor that:
detects a first region in the image that includes a character and that detects a second region in the image that includes a text-line comprising at least a particular number of first regions, the second region detected based at least in part on the detection of the first region; and
detects a variation in position and attitude of a camera at a time when the image is shot; and
a controller that causes the hardware processor to detect the second region in the image when the variation is less than or equal to a threshold,
wherein the controller changes a setting of the hardware processor associated with the detection of at least one of the first region and the second region and causes the hardware processor to detect the second region in the image when the second region is not detected by the hardware processor,
wherein the controller instructs the camera which sequentially obtains images to reduce intervals between obtaining images when it is determined based on the variation that the camera is in a moving state of a substantially constant velocity, and
wherein the controller:
sets a first dictionary as a character detection dictionary used by the hardware processor to detect the first region in the image when it is determined based on the variation that the camera is in a substantially stationary state; and
sets a second dictionary that is different from the first dictionary as the character detection dictionary when it is determined based on the variation that the camera is in a moving state of a substantially constant velocity.

14. The information processing apparatus of claim 13, wherein the hardware processor analyzes the image to determine a setting to detect at least one of the first region and the second region in the image,
wherein the controller causes the hardware processor to determine the setting before execution of the detection of the second region in the image and configures the setting as an initial setting when the variation is less than or equal to the threshold.

15. The information processing apparatus of claim 13, wherein the image processor corrects blurring in the image,
wherein the controller causes the image processor to correct blurring in the image or in a partial image corresponding to the first region or the second region when it is determined based on the variation that the camera is in the moving state of the substantially constant velocity.

16. An information processing apparatus comprising:
an image processor that acquires an image;
a hardware processor that:
detects a first region in the image that includes a character and that detects a second region in the image that includes a text-line comprising at least a particular number of first regions, the second region detected based at least in part on the detection of the first region; and
detects a variation in position and attitude of a camera at a time when the image is shot; and
a controller that causes the hardware processor to detect the second region in the image when the variation is less than or equal to a threshold, wherein the controller changes a setting of the hardware processor associated with the detection of at least one of the first region and the second region and causes the hardware processor to detect the second region in the image when the second region is not detected by the hardware processor, and wherein the controller:
  sets a first dictionary as a character detection dictionary used by the hardware processor to detect the first region in the image when it is determined based on the variation that the camera is in a substantially stationary state; and
  sets a second dictionary different from the first dictionary as the character detection dictionary when it is determined based on the variation that the camera is in a moving state of a substantially constant velocity.

17. The information processing apparatus of claim 16, wherein the controller instructs the camera which sequentially obtains images to reduce intervals between obtaining the images when it is determined based on the variation that the camera is in a moving state of a substantially constant velocity.

18. The information processing apparatus of claim 16, wherein the image processor corrects blurring in the image,
  wherein the controller causes the image processor to correct blurring in the image or in a partial image corresponding to the first region or the second region when it is determined based on the variation that the camera is in the moving state of the substantially constant velocity.

19. An information processing method comprising:
  acquiring an image;
  detecting a variation in position and attitude of an imaging module at a time when the image is shot;
  detecting a first region in the image that includes a character and detecting a second region in the image that includes a text-line comprising at least a particular number of first regions, the second region detected based at least in part on the detection of the first region when the variation is less than or equal to a threshold; and changing a setting associated with detection of at least one of the first region and the second region and executing detection of the second region in the image when the second region is not detected, analyzing the image to determine a setting associated with detection of at least one of the first region and the second region before execution of the detection of the second region in the image and configuring the setting as an initial setting when the variation is less than or equal to the threshold, instructing the imaging module which sequentially obtains images to reduce intervals between obtaining the images when it is determined based on the variation that the imaging module is in a moving state of a substantially constant velocity, setting a first dictionary as a character detection dictionary used to detect the first region in the image when it is determined based on the variation that the imaging module is in a substantially stationary state; and setting a second dictionary that is different from the first dictionary as the character detection dictionary when it is determined based on the variation that the imaging module is in a moving state of a substantially constant velocity.

* * * * *